United States Patent [19]
Taylor et al.

[11] 3,809,320
[45] May 7, 1974

[54] CUTTING TORCH

[75] Inventors: Edwin K. Taylor, Oklahoma City;
James V. Boyd, Jones, both of Okla.

[73] Assignee: Sooner Products Company, Bristow, Okla.

[22] Filed: Mar. 21, 1973

[21] Appl. No.: 343,193

[52] U.S. Cl.......... 239/416.4, 239/417.3, 239/424.5, 266/23 R
[51] Int. Cl.............................................. B05b 7/06
[58] Field of Search ........ 239/398, 407, 413, 416.4, 239/416.5, 417.3, 424, 424.5; 266/23 P, 23 Q, 23 R, 23 T

[56] References Cited
UNITED STATES PATENTS
| | | | |
|---|---|---|---|
| 3,180,396 | 4/1965 | Eichelman et al. | 266/23 P X |
| 3,583,643 | 6/1971 | Ollivier et al. | 239/424.5 |
| 3,643,871 | 2/1972 | Hamernik et al. | 239/424.5 X |

*Primary Examiner*—M. Henson Wood, Jr.
*Assistant Examiner*—Michael Y. Mar
*Attorney, Agent, or Firm*—Head & Johnson

[57] ABSTRACT

In conventional oxygen-fuel cutting torches there is a central orifice through which oxygen passes when the oxygen valve is opened, and there are a plurality of smaller orifices coaxial with the central orifice through which a controlled mixture of oxygen and fuel passes which provides a preheating flame to heat the work to a kindling temperature so that the oxygen will cause it to burn. This invention provides a controlled bypass means between the output of the mixer in which the fuel and oxygen are combined, to pass this mixture into the center orifice during the period the oxygen is not being used. Thus a larger central orifice is provided so that a large preheat flame is provided at the center of the torch.

5 Claims, 7 Drawing Figures

PATENTED MAY 7 1974    3,809,320
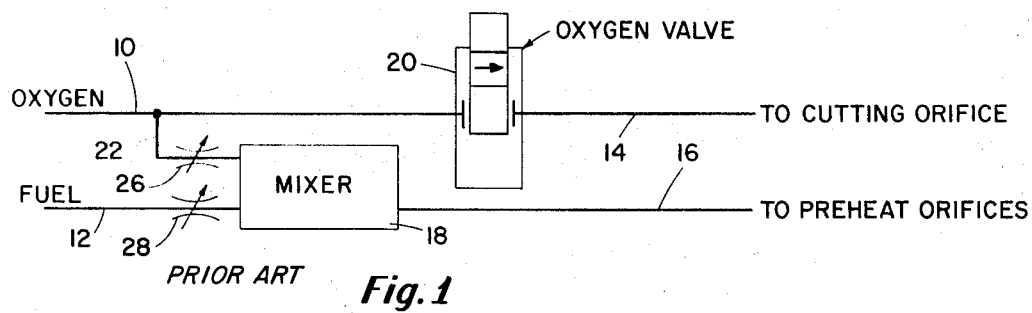
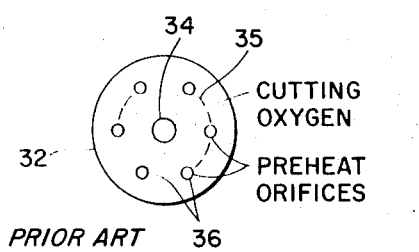
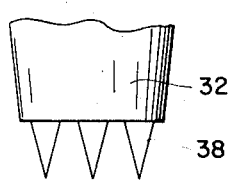
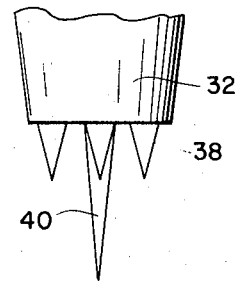
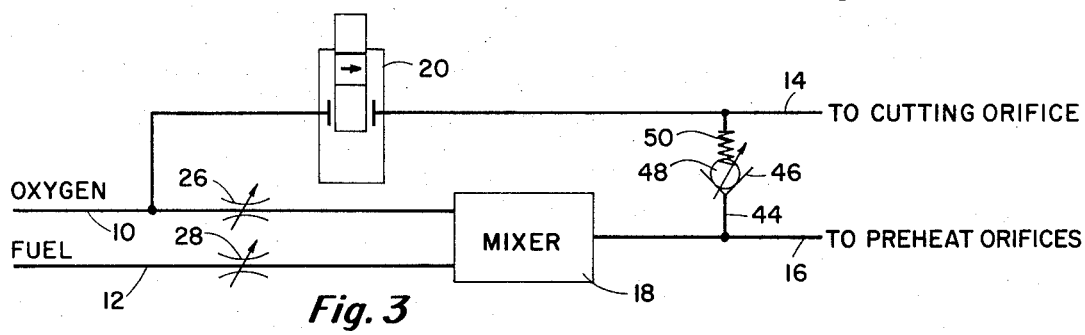
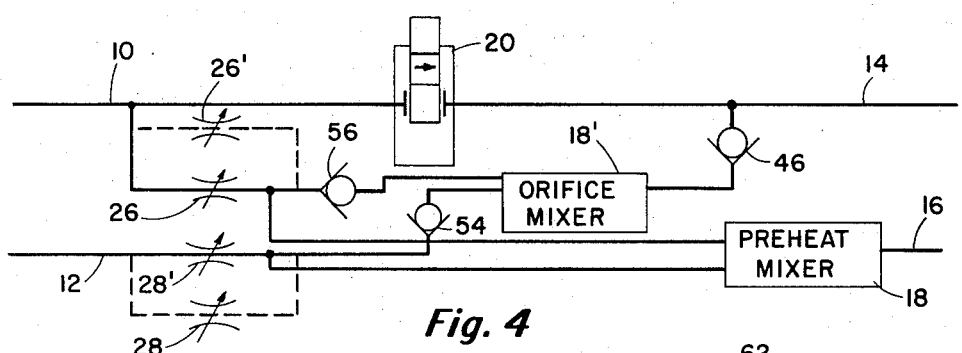
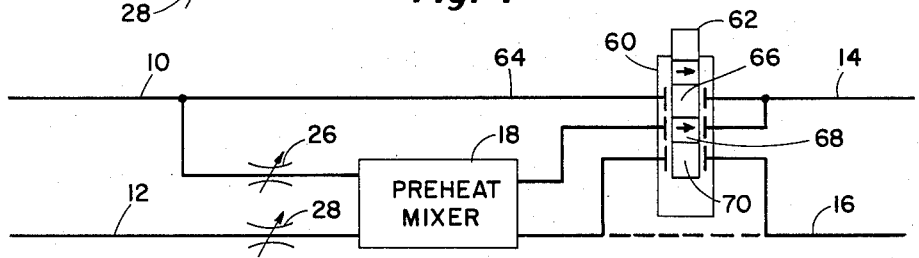

CUTTING TORCH

BACKGROUND OF THE INVENTION

This invention is in the field of oxygen-fuel cutting torches. In the prior art conventional oxygen cutting torches provide a central orifice through which oxygen is directed, after the work is preheated, so as to cut the work material. The central orifice is surrounded by a plurality of smaller orifices. A selected mixture of oxygen and fuel is controlled by valves in each of the oxygen and fuel lines to a mixer. The mixer output is directed to the circumferential orifices. In preparing a workpiece to be cut, a localized area of the workpiece is heated by a preheat fuel-oxygen mixture, directed to the circumferential orifices. Generally there is insufficient fuel available and the flames are short, so that the torch must be placed close to the workpiece. The diameter of the circle of orifices is large, and the heat is applied at a circle rather than at a point, which is at the center of this circle. Thus, the highest temperature is not at the point at which the oxygen jet will be directed, and therefore there is considerable burning to the sides of the oxygen jet and therefore a wider kerf is obtained.

SUMMARY OF THE INVENTION

It is an object of this invention to provide a oxygen-fuel cutting torch which provides improved heating operations by providing an additional jet of flame through the central oxygen orifice, which not only provides more heat to more quickly preheat the workpiece, but the preheat flame is directed directly to the point at which the kerf is to be cut. Thus after the work is preheated and the oxygen flow is turned on a jet of oxygen issues from the central orifice and is directed against the hottest part of the workpiece and therefore begins to cut more readily than when the workpiece is heated by this circumferential jet alone.

This and other objects are realized and the limitations of the prior art are overcome in this invention by adding to the conventional oxygen-fuel cutting torch a bypass valve between the pipe which carries the mixture of fuel and oxygen to the preheat orifices, and the central orifice. This bypass valve can be a manual valve which controls both the oxygen flow to the central orifice, and the bypass flow of oxygen-fuel mixture to the central orifice. When oxygen is flowing the bypass flow is cut off, and vice versa.

One particular type of bypass valve is a spring loaded check valve connected between the output of the mixer and the oxygen line, going to the central orifice. When the mixture pressure is higher than the oxygen pressure, that is, when the oxygen flow is cut off, mixer gas flows not only through the preheat orifices but bypasses also to the central or oxygen orifice. This provides additional heat and directs that heat to the precise spot where oxygen flow will later be directed.

BRIEF DESCRIPTION OF THE DRAWINGS

These and other objects of this invention and a better understanding of the principles and details of the invention will be evident from the following description, taken in conjunction with the appended drawings, in which:

FIG. 1 shows the prior art system for carrying oxygen and fuel gases to the cutting torch.

FIG. 2A shows the normal or prior art arrangement of orifices in the cutting torch.

FIG. 2B shows the preheat jets adjacent each of the circumferential orifices of FIG. 2A.

FIG. 2C indicates the improved preheat jet in which the circumferential jets of flame are augmented by a central long jet of flame.

FIG. 3 indicates the improved version of this invention.

FIG. 4 is a variation of FIG. 3 in which a separate mixer for the bypass gas that goes to the central oxygen orifice is used instead of having the normal preheat gas mixture provided as gas.

FIG. 5 illustrates a combination in which the oxygen flow and the bypass preheat gas flow are coordinated in a single valve structure.

DESCRIPTION OF THE PREFERRED EMBODIMENT

Referring now to the drawings and in particular to FIG. 1, there is shown a prior art type of oxygen-fuel cutting torch. Two pipes are provided, an oxygen inlet pipe 10 and a fuel inlet pipe 12. These go by means of valves 26 and 28 to a mixer 18, in which the oxygen and fuel are mixed to the proper ratio and flow out through pipe 16 which goes to the preheat orifices of the cutting head. The line 10 passes through a valve 20 by means of which oxygen flow is controlled to the central orifice of the cutting head. In normal practice the oxygen flow is cut off at the valve 20 and the preheat gas is passed to the preheat orifices that provide a plurality of small jets.

In FIG. 2A is shown an end view of the orifice face 32 of the torch. There is a central orifice opening 34 through which oxygen flows from valve 20. There are a plurality of smaller orifices 36 arranged in a circle 35 around the central orifice 34. These orifices 36 are of smaller size than the central orifice.

When the valve 20 is closed and oxygen and fuel are mixed in the mixer 18 and flow out through line 16 to the circumferential orifices 36, and are ignited, there will be a plurality of short pointed flames 38 (FIG. 2B) which are used to preheat the workpiece to a temperature of approximately 1,500° F., for example, for mild steel. Because of the limited flow through the smaller orifices and the short flame, the torch must be held close to the workpiece, and it is difficult because of the large size of the torch, to see that it is placed precisely over the cutting line. Furthermore, because of the circle 35 of orifices 36 being quite large, compared to the size of the oxygen orifice the hottest part of the workpiece is not at the center of the circle where the oxygen will later be injected. Thus the burning will first take place on the circumference of the circle of flames, that is, about the circle 35 diameter of the circumferential orifices. In FIG. 2C is shown schematically the improved flame structure when mixer gas is bypassed to the center orifice. This is done when oxygen is not flowing, and therefore considerably greater flow of oxygen-fuel mixture is available and the long pointed flame 40 enables the operator to determine exactly that the heating takes place on the work line.

In FIG. 3 is shown one version of the improved system of this invention. What has been done is to provide a bypass, shown schematically as a check valve 46 arranged in a conduit 44 that extends between the line 16 and the line 14. The line 14 is the oxygen line which is directed to the central orifice of the cutting head. When the check valve is opened, a mixture of fuel and oxygen will flow from the mixer 18 through the bypass 44 through valve 46 to line 14 and to the cutting orifice. The flame will then be shown as in FIG. 2C with the long pointed heating flame 40 directed against the workpiece. The ball 48 of check valve 46 is held in its seat by means of a spring 50 so that at a certain pressure of mixer gas in the line 16 the valve will open and bypass gas will pass. However, as soon as the oxygen valve 20 is opened, the pressure of the oxygen gas in line 14 will be higher than the mixture gas in line 16 and the valve will close, preheat will still continue in the circumferential orifices, and oxygen will then flow through the central orifice being directed against the precise spot on the workpiece where the augmented preheat flame was directed. This bypass is automatic, so that when the oxygen is cut off the preheat flame is bypassed and vice versa. By this means in the use of the bypass not only is the preheat more rapid because of the larger flow of gas, but the preheat is directed principally along the axis of the face of the cutting torch.

In FIG. 4 the action is similar except that a separate mixer is provided. The bypass mixer 18' is provided with check valves 56 and 54 on the input oxygen and fuel line. These can be connected to the same valves 26 and 28 which control the individual gases to the preheat mixer 18. However, they are preferably connected to the oxygen and fuel lines by separate valves 26' and 28' (shown dashed) since it is likely that a different mixture and flow will be desired in the bypass mixer 18'. For example, the flame will be a much larger and a different type of flame than the individual flames in the small circumferential orifices 36. As before, the preheat mixer 18 provides gas through line 16, through the preheat orifices. Oxygen valve 20 provides oxygen through line 14 to the oxygen orifice. The check valve 46 operates exactly as the valve in FIG. 3 so that it cuts off the bypass flow whenever there is oxygen pressure in line 14 higher than the pressure on the outlet of the bypass mixer 18'.

In FIG. 5 is shown another variation in which the bypass valving from the preheat mixer 18 goes through portion 68 of the valve 60, while oxygen flow goes through portion 66 of valve 60. The spool or spindle 62 is moved vertically. In its present position the oxygen flow from line 64 to line 14 is closed at the point 66 while flow from the preheat mixer 18 to line 14 is open as shown by the portion 68. There is shown an additional portion 70 connected in the line 16 so that when preheat gas from mixer 18 is flowing to line 14 and to the central orifice the preheat mixture of gas is cut off at point 78 in the valve 60. There is no flow to the circumferential openings. Then when the valve is moved so that oxygen flows through the portion 66, then mixer gas will flow through the portion 70 to the circumferential orifices and the bypass gas through 68 will be cut off. It may be desirable to have some overlap between portions 68 and 70 so that there will be a continuous flame, either in the circumferential orifices or in the center orifices.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. In an oxygen-fuel cutting torch having:
   a. an oxygen inlet pipe;
   b. a fuel inlet pipe;
   c. an oxygen-fuel preheat mixer means connected through oxygen and fuel control valves to corresponding inlet pipes;
   d. an oxygen control valve connected between said oxygen inlet pipe and the oxygen orifice in the cutting torch head;
   e. the outlet of said preheat mixer connected to the preheat orifices in said cutting torch head;
   the improvement comprising bypass valve means connected between and permitting flow of preheat mixer gas from said preheat mixer outlet to said oxygen orifice.

2. The oxygen-fuel cutting torch as in claim 1 in which said bypass valve means is a check valve, whereby when the pressure of said preheat mixer outlet gas is greater than the pressure of oxygen in the line to said oxygen orifice, said preheat mixer gas will flow to said oxygen orifice.

3. The oxygen-fuel cutting torch as in claim 1 in which said bypass valve means is combined with said oxygen control valve in a unitary structure; whereby when said oxygen valve is open, said bypass is closed and vice versa.

4. The oxygen-fuel cutting torch as in claim 3 including additional second valve means to control the flow of mixer gas to said preheat orifices, whereby when said bypass is open, said second valve means is closed and vice versa.

5. The oxygen-fuel cutting torch as in claim 1 including:
   a. bypass mixer means;
   b. check valves in the two inlet lines of said bypass means;
   b. check valves in the two inlet lines of said bypass mixer means;
   c. the two inlets to said bypass mixture means connected through valves to said two inlet pipes;
   d. said bypass valve means connected from the outlet of said bypass mixer means to said oxygen orifice.

* * * * *